United States Patent [19]

Hirano et al.

[11] Patent Number: 5,704,216
[45] Date of Patent: Jan. 6, 1998

[54] REFRIGERATING UNIT

[75] Inventors: Yutaka Hirano, Ohta; Takeo Komatubara, Kiryu; Takashi Sunaga, Ohra-gun; Yasuki Takahashi, Sawa-gun; Kiyoshi Tanaka, Ohra-gun; Kiyoshi Akazawa, Ohra-gun; Masato Watanabe, Ohra-gun; Seiki Jikuhara, Akoh, all of Japan

[73] Assignee: Sanyo Electric Co., Ltd., Osaka, Japan

[21] Appl. No.: 562,364

[22] Filed: Nov. 22, 1995

Related U.S. Application Data

[63] Continuation of Ser. No. 195,278, Feb. 14, 1994.

[30] Foreign Application Priority Data

Feb. 12, 1993 [JP] Japan ................................. 5-24169

[51] Int. Cl.$^6$ ................................................. C01M 107/00
[52] U.S. Cl. ................................................. 62/114; 252/68
[58] Field of Search ................................. 62/114; 252/67, 252/68, 69

[56] References Cited

U.S. PATENT DOCUMENTS

| | | | |
|---|---|---|---|
| 4,755,316 | 7/1988 | Magid et al. | 252/68 |
| 5,185,092 | 2/1993 | Fukuda et al. | 252/68 |
| 5,454,963 | 10/1995 | Kaneko | 252/68 |
| 5,486,302 | 1/1996 | Short | 252/67 |
| 5,543,068 | 8/1996 | Kaimai et al. | 252/68 |

*Primary Examiner*—William Doerrler
*Attorney, Agent, or Firm*—Darby & Darby

[57] ABSTRACT

A refrigerating unit having at least one refrigerating machine oil using polyol ester system oil as its base oil in at least one refrigeration cycle using at least one hydrofluorocarbon system refrigerant as a refrigerant, the present invention sets the purity of hydrofluorocarbon system refrigerant to the level higher than 99.95 wt % and the mixing of chlorine system refrigerant to the level lower than 80 ppm. In addition, the performance and reliability of refrigerating unit using the hydrofluorocarbon system refrigerant such as R134a can be enhanced by making the said polyol ester system oil to be the chemical compound of particular physical properties, by suppressing the equilibrium water content of refrigeration cycle and by limiting the residual chlorine volume.

13 Claims, 4 Drawing Sheets

Endurance period (months)

REFRIGERATING UNIT

This is a continuation of application Ser. No. 08/195,278, filed Feb. 14, 1994.

BACKGROUND OF THE INVENTION

1. Field of the Invention

The present invention relates to a refrigerating unit having a refrigerating machine oil using polyol ester oil as its base oil in a refrigeration cycle using hydrofluorocarbon system refrigerants, such as 1,1,1,2-tetrafluoroethane (hereunder to be called R134a).

2. Background Art

Compressors for a refrigerator and an automatic vending machine as well as a show case have used in many cases dichlorodifluoromethane (hereunder to be called R12) as a conventional refrigerant. This R12 has become the object of regulated fluorocarbons because of the problem of destruction of the ozone layer. And as the alternative refrigerant for this R12, the hydrofluorocarbon (HFC) refrigerant and the fluorocarbon (FC) refrigerant representing R134a are being studied as the refrigerants for a refrigerator, which is disclosed, for example, in the Japanese Patent Laid-Open Publication No. 1-271491.

However, there is a problem related to the lubrication of the compressor because the refrigerant R134a has a worse compatibility with such refrigerating machine oils, such as mineral oil and alkylbenzene now being used and because of the aggravation of oil return to the compressor and also the suction of isolated refrigerant during its re-start when the refrigerating machine oil has separated from the refrigerant while the refrigerator was stopped.

For this reason, the inventors studied the polyol ester system oil as the refrigerating machine oil because it has a compatibility with the refrigerant R134a. However, it is known that this polyol ester system oil causes erosion of the sliding members by the fatty acid produced after the decomposition of said oil and causes an abrasion if this oil is being used in a refrigerant compressor, especially in a rotary type compressor.

And as a result of studying-many times in order to combine the R134a as a refrigerant with the polyol ester system oil as a refrigerating machine oil, the inventors have discovered that the polyol ester system oil causes hydrolysis by the influence of water with the rise of its total acid number, and a metallic soap is produced which becomes a sludge, giving an adverse influence on the refrigeration cycle, and that decomposition, oxidation- deterioration and polymerization reactions are caused by the influences of oxygen and chlorine, and the metallic soap and the high molecule sludge are produced which exert an adverse influence on the refrigeration cycle.

The inventors have also found a problem in that the chlorine system refrigerant is also mixed into the hydrofluorocarbon refrigerant being sealed especially during the refrigeration cycle, and if the mixed volume should be large, the chlorine volume becomes large, which invites the generation of metallic soap and the generation of high molecule sludge by the decomposition, oxidation deterioration and polymerization reaction of polyol ester oil, and stays stagnant in the evaporator and the like of the refrigeration cycle.

In addition, the inventors have also learned that the problem as described above is also caused if the volume of chlorine should be large that remains behind in the component parts such as the compressor, condenser, various kinds of pipes, etc., which make up the refrigerating unit.

Moreover, the inventors have also ascertained that the generation of such a problem occurs when mineral oil has been conventionally used during the machining and assembling of component parts, and because this mineral oil can not be dissolved easily into the refrigerant of hydrofluorocarbon, it becomes solidified and stays stagnant in the evaporator and the like during the refrigeration cycle, aggravates the refrigeration capability and damages the equipment if said mineral oil should stay stagnant in excess of a certain level of volume.

Therefore, in the refrigerating unit using the polyol ester oil and the hydrofluorocarbon system refrigerant, the inventors have found out that the said problems can be solved by using a particular polyol ester oil, adding a special additive to said oil, maintaining the purity of hydrofluorocarbon system refrigerant at a high value and suppressing the equilibrium water content or chlorine residual volume of the refrigeration cycle. Moreover, the inventors have found out that the problematic point can be solved by installing a sludge catcher for capturing the sludge during the refrigeration cycle.

This invention is for solving the said problem and its object is to solve the said problem when the polyol ester system oil having the compatibility with the hydrofluorocarbon system refrigerant (for example, R134a) has been used as the refrigerating machine oil and to obtain a favorable refrigerating unit.

SUMMARY OF THE INVENTION

Therefore, the present invention has built up a refrigerating unit which has at least one refrigerating machine oil using polyol ester oil as its base oil, whose hydrofluorocarbon system refrigerant has its purity higher than 99.5 wt % and where the mixing of chlorine system refrigerant is less than 80 ppm in at least one refrigeration cycle using the hydrofluorocarbon system refrigerant, as described in claim 1.

In addition, in the refrigerating unit of the invention, the said polyol ester oil has been made the chemical compound which is a polymerized polyol having two functional groups or more with alkyl system fatty acid having a straight Chain or a branched chain without catalyst, whose fluidity point is lower than −40° C., with a two-liquid separation temperature lower than −20° C., total acid value is than 0.02 mgKOH/g, viscosity of 8 to 100 cst at 40° C. and viscosity index of more than 80.

Also, the refrigerating unit of the invention is further characterized in that the said refrigeration cycle is structured by using pipes for connecting at least one compressor, one condenser, one pressure reducing unit and one evaporator, and that at least one sludge catcher for capturing the sludge during the cycle is installed at the high pressure side of this refrigeration cycle.

Further, the refrigerating unit of the invention is characterized in that the said refrigerating machine oil contains at least one kind of base oil being selected from the group consisting of alkylbenzene system oils or mineral system oils.

In a preferred embodiment, the refrigerating unit is characterized in that the polyol having two functional groups or more is selected from the group consisting of neopentylglycol, trimethyrolpropane and pentaerythritol.

In addition, the equilibrium water content during the refrigeration cycle (to be shown by the following equation (I)) is lower than 200 ppm 10 in the initial state of operation:

$$\frac{\text{Residual water content volume during the refrigeration cycle}}{\text{Filled oil volume + Filled refrigerant volume}} \times 10^6 \text{ (ppm)} \qquad (I)$$

In addition, in the refrigerating unit the residual oxygen volume during the refrigeration cycle is made less 20 than 0.01 vol % of the volume inside the refrigeration cycle.

Moreover, the refrigerating unit comprises component parts which are at least one compressor, one condenser, one pressure reducing unit and one evaporator, the alkylbenzene hard oil (hereinafter, to be called HAB) or the ester system oil is used as the oil being used during the machining and assembling processes for component parts making up the refrigerating unit and that the use volume of HAB, if used, has been made lower than 10% of the sealed volume of oil in the refrigerating unit, described in claim 8.

Further, the chlorine volume remaining in the component parts the refrigerating unit has been made lower than 20 ppm compared to the total volume of oil and its refrigerant sealed into the refrigeration cycle.

Moreover, the total volume of the chlorine system refrigerant mixed inside the hydrofluorocarbon system refrigerant that is sealed into the refrigeration cycle and the chlorine volume remaining in the component parts has been made lower than 100 ppm against the total volume of oil and refrigerant sealed into the refrigeration cycle.

Additionally, one embodiment of 0.1 to 0.5 wt % of at least one phenol system oxidation preventive agent is added as an additive agent into the polyol ester oil, that is to be selected especially from the group consisting of 2,6-di-tertiarybutylparacresol (DBPC), 2,6-di-tertiarybutyl-phenol and 2,4,6-tri-tertiarybutyl-phenol.

Moreover, at least one copper inactivation agent lower than 20 ppm is added as an additive into the polyol ester oil, that is to be selected especially from the benzotriazole (BTA) system chemical compound.

Further, as another feature, at least an extreme pressure additive of lower than 2 wt % is added as the additive into the polyol ester oil, that is to be selected especially from the phosphoric acid triester system chemical compound.

Moreover, in the refrigerating unit of the invention, the epoxy system additive of 0.1 to 0.5 wt % is added as the additive into the polyol ester oil.

The present invention provides the following mode of operation because it has been structured as described above.

Because the purity of hydrofluorocarbon system refrigerant has been made an extremely high one by the structure as mentioned, the foreign materials and CFC hardly get mixed into the refrigeration cycle, there is a suppression of the action of the chlorine in dissolving the polyol ester oil into the formation of fatty acid that reacts with the metals and forms metallic soap. Also, the deposition of sludge can be reduced, the compatibility between the polyol ester oil and the refrigerant is secured and the stable performance can be obtained.

Further, the polyol ester oil of this invention makes the compatibility with the hydrofluorocarbon system refrigerant favorable throughout the entire temperature zone to be used in the refrigerating unit because of the structure, and can eliminate the two-layer separation of the refrigerant and the oil. Therefore, because the polyol ester oil exists in its state dissolved into the hydrofluorocarbon system refrigerant (for example, R134a) at all times in the low temperature region lower than −30° C. in the refrigeration cycle and becomes a low viscosity as a whole, the oil return to the compressor favorable. Therefore, the fall of the oil level of the compressor can be eliminated, the oil supply to the bearing sliding areas can be secured and the gnawing and the burning can be prevented. Still more, by such an action that the ester coupling of the oil itself is molecule-oriented mainly on the surfaces of the metallic system sliding area of shaft and bearings of the compressor and by such an action that the said ester coupling can be dissolved easily into the refrigerant (for example, R134a), the polyol ester oil of this invention can lower the actual viscosity, decrease the machine loss and enhance the actual record coefficient of compressor.

In addition, because the sludge catcher (for example, being built up by caking the active alumina particles with a binder) for capturing the sludge in the cycle has been installed to the high pressure side of refrigeration cycle, the sludge being generated in the refrigeration cycle and the fatty acid being caused by the hydrolysis of ester oil can be adsorbed by this sludge catcher to previously prevent the formation of metallic soap.

Furthermore, because the alkylbenzene system oil or the mineral system oil are used as the base oil in addition to the polyol ester oil as the base oil of the refrigerating machine oil, the trouble of polyol ester oil, in other words, the electrolyte by frictional heat and the like of sliding portions of the compressor can be lowered down to the minimum level, suppressing the formation of metallic soap and preventing almost all the sludge. Consequently, the fall of the oil level of the compressor can be eliminated, the oil supply to the bearing sliding portions can be secured, and the gnawing and the burning (seizure) can be prevented.

Also, in the initial operation period of refrigerating unit, it is possible to prevent the oil from causing any hydrolysis because of the structure of claim 6, to decrease the total acid value, to suppress the generation of sludge due to the formation of metallic soap and to secure the lubrication characteristics in the sliding areas.

In addition, the invention makes it possible to prevent the oxidation and deterioration of polyol 10 ester oil and the sludge by the polymerization, and to cause the refrigerating unit to have an excellent reliability.

Further, because the alkylbenzene hard oil (HAB) and the ester oil that can be easily dissolved into the 15 hydrofluorocarbon system refrigerant are used during the machining and assembling of component parts and the used volume of HAB, if used, has been limited, the residual chlorine volume of component parts can be vastly decreased, its solidification to the evaporator and so forth in the refrigeration cycle can be prevented, and the fall in the refrigeration capability and the damage to the equipment can be prevented in advance.

Because the chlorine volume remaining on the component parts of the compressor, condenser, various pipes and the like making up the refrigerating unit has been regulated and prevents the formation of metallic soap and high molecule sludge coming from the decomposition, oxidation/deterioration and plymerization reaction of polyol ester oil can be prevented, and it can also be prevented that the sludge remain stagnant on the evaporator and so forth of refrigeration cycle.

Moreover, because the total volume between the mixed volume of the chlorine system refrigerant in the hydrofluorocarbon system refrigerant being sealed into the refrigeration cycle and the chlorine volume remaining on the component parts of refrigerating unit has been regulated to a level lower than 100 ppm against the total volume of oil and refrigerant being sealed into the refrigeration cycle, the mixing of chlorine in the refrigeration cycle can be regulated as an entire unit, the formation of metallic soap coming from the decomposition, oxidation and deterioration, polymerization and reaction and the formation of high molecule sludge can be prevented, thus being able to provide a refrigerating unit capable of exhibiting a stable performance.

Further, the polyol ester oil according to the present invention can enhance the oxidation/deterioration stability as compared with the glycol oil and the like, and enhance the performance and reliability of the compressor.

Moreover, the invention can suppress the adsorption and its catalyst action on the copper surface which becomes the bearing sliding surfaces, and can suppress the hydrolysis of refrigerating machine oil.

In addition, a strong chemical adsorption film if formed on the bearing sliding surfaces to make the lubrication property of the sliding portions better and prevent the gnawing and burning.

Besides, the invention can suppress the hydrolysis, decrease the total acid value to suppress the formation of metallic soap and can enhance the reliability of unit.

DETAILED DESCRIPTION OF THE PREFERRED EMBODIMENTS

Hereunder, the present invention is to be explained on the basis of the embodiments shown in the drawings.

Figure 1:
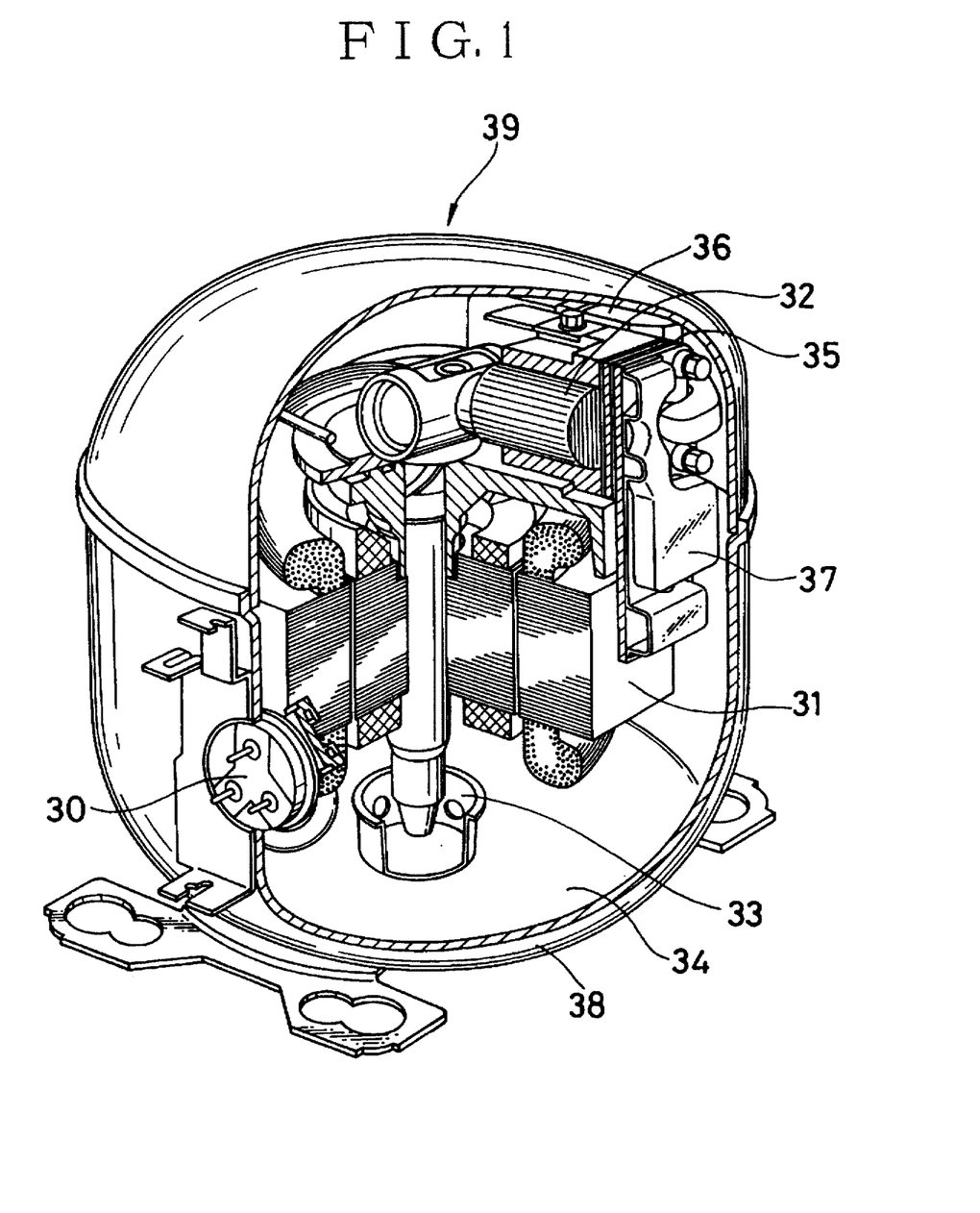
FIG. 1 is a partially cut view indicating the entire reciprocation type compressor showing one embodiment according to the present invention.

FIG. 1 is a partially cut view of a reciprocation type compressor 39, which comprises a compressor unit 36 housed in the upper portion of a hermetic case 38 containing lubricating oil 34 at its bottom, and an electric motor unit 31 housed in the lower portion of said case 38 and connected to the compressor unit 36 by a crankshaft. And said electric motor unit 31 is driven by electric power from a power supply terminal 30. A fluorocarbon gas sealed into said hermetic case 38 flows through a suction muffler 36 and a suction side of a valve unit 35 to compression room of said compressor unit 36, and is compressed via piston 32 of compressor unit 36. Said oil 34 in the bottom of the case 38 is forced upward through an oil cup 33 by centrifugal action of the crankshaft. And said oil 34 is supplied to the surfaces to provide improved lubrication characteristics. In addition, polyol ester oil is used as said lubricating oil 34 and 1,1,1,2-tetrafluoroethane (HFC134a) is used as said fluoro gas.

Figure 2:
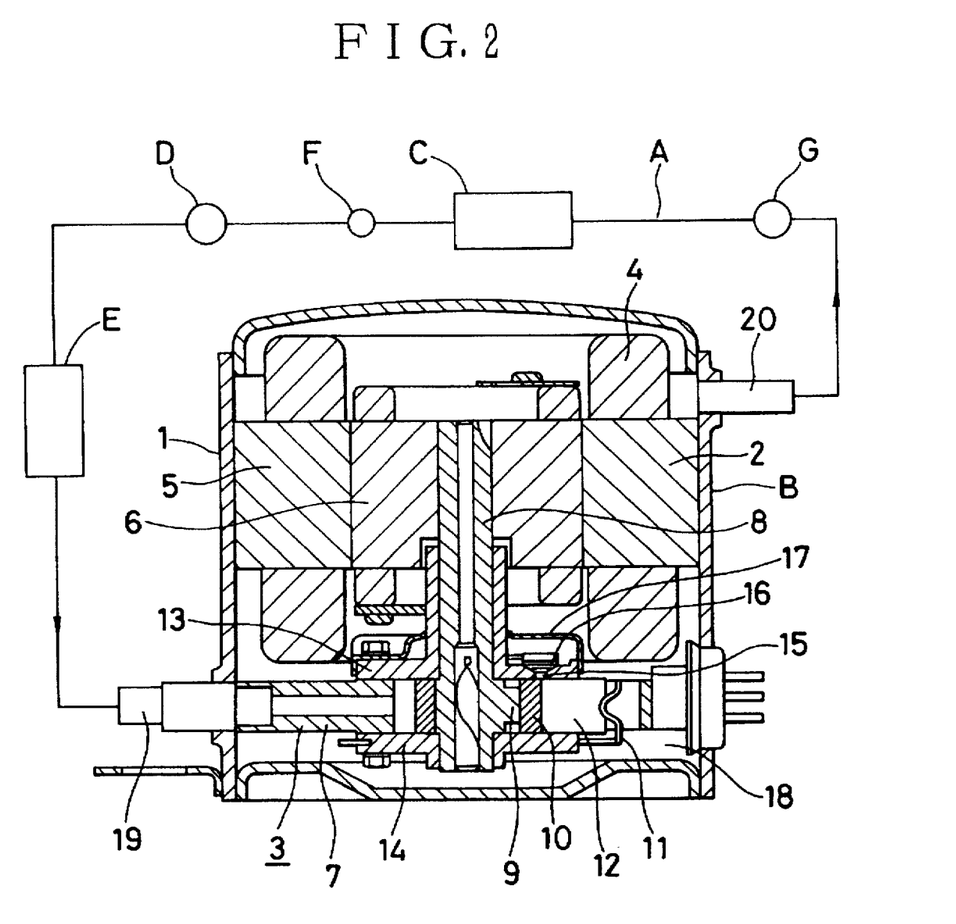
FIG. 2 is a vertical cross sectional view of rotary type compressor showing one embodiment of this invention.

On the other hand, FIG. 2 is a vertical-cross section view of rotary type compressor and is a view showing the other structural refrigeration circuit components. Letter A in FIG. 2 is a refrigeration cycle making up the refrigerating unit, and is structured by connecting with pipes a compressor B, a condenser C, a pressure reducing unit D, an evaporator E, a dryer F and a sludge catcher G. Here, the dryer F is formed of molecular sieves which are publicly known materials, while the sludge catcher G is formed by bonding active alumina particles with a binder. And, the above mentioned compressor B has the structure as follows:

Numeral 1 denotes a closed vessel, and a motor element 2 and a rotary compressor element 3 being driven by the said motor element are respectively stored on the upper side and the lower side inside this vessel. The motor element 2 is structured of a stator 5 having a winding 4 insulated by an organic system material and a rotor 6 installed inside the said stator. The rotary compressor element 3 is structured of a cylinder 7, a roller 10 turned along the inside wall of the cylinder by an eccentric portion 9 of a rotary shaft 8, a vane 12 being pressed against the circumferential face of said roller and pressed by a spring 11 so as to partition the inside of cylinder 7 into its suction side and its discharge side, and an upper bearing 13 and a lower bearing 14 not only for closing the opening of cylinder 7 but also for supporting the rotary shaft 8.

And, a discharge hole 15 interconnected with the discharge side of cylinder 7 is installed for the upper bearing 13. Further, a discharge valve 16 for opening and closing the discharge hole 15 and a discharge muffler 17 so as to cover the said discharge valve are mounted on the upper bearing 13.

The roller 10 and the vane 12 may be made of ferrous system materials. Further the roller 10 may be made by casting, preferably by continuous casting. In addition, the vane 12 may be made of carbon materials.

Hereunder, some concrete embodiments according to the present invention are being explained on the basis of FIG. 2.

The oil 18 of polyol ester oil, which consists of the chemical compound which has been obtained by polymerizing a polyol having two functional groups or more with an alkyl fatty acid having a straight chain or a branched chain using no catalyst, whose fluidity point is −50° C., two-liquid separation temperature is −300° C., total acid value is lower than 0.01 mgKOH/g, viscosity is 32 cst at 40° C.; and viscosity index is 95, is stored at the bottom area inside the closed vessel 1.

Such polyols having two functional groups or more can be enumerated, for example, as the neopenthylglycol, trimethyrolpropane and pentaerythritol, etc. In addition, such alkyl fatty acids having a straight chain or a branched chain can be enumerated, for example, as the pentane carbonic, acid, hexane carbonic acid, heptane carbonic acid, octane carbonic acid, neopentane carbonic acid, neohexane carbonic acid, neoheptane carbonic acid, 2-methylhexane carbonic acid, 2-ethylhexane carbonic acid, 3,5,5-tri-methylhexane carbonic 5 acid, etc.

The paraffin system or naphthane system mineral system oil or alkylbenzene system oil and the like having excellent abrasion resistance, oxidation stability, electric insulation property, etc. and whose dynamic viscosity at 40° C. is 36.2 cst though its compatibility with such a refrigerant as R134a is worse, may also be mixed into the said refrigerating machine oil. Suniso-1GS (trade name) as mineral system oil and Shrieve 01-150 (trade name) as alkylbenzene system oil can be enumerated.

The polyol ester system oil needs to be contained at more than 10 to 15 weight % or more favorably to be contained at more than 20 weight % if being mixed.

0.3 wt % of phenol system oxidation preventive agent of 2,6-di-tertiarybutyl-paracresol (DBPC) as an additive is added into this polyol ester oil for the purpose of preventing the oxidation/deterioration under a long period storage, and 0.25 wt % of epoxy system additive is added for the purpose of preventing the hydrolysis.

For information, the copper inactivation agent of 5 ppm beftzotriazole (BTA) and the extreme pressure additive of 1 wt % tricresylphosphate (TCP) are added to this polyol ester oil as necessary.

The general chemical compounds can be used as the oxidation preventive agent, but the phenol system oxidation preventive agent is especially favorable, and for example, 2,6-di-tertiarybutyl-paracresol, 2,6-di-tertiarybutyl-phenol, 2,4,6-tri-tertiarybutyl-phenol, etc. of said oxidation preventive agent can be used.

On the other hand, the phenylglycydylether, 2–10 ethylhexyl-glycydylether, 1,2-epoxy-cyclohexane, etc. can be preferably used as the epoxy system additive.

The benzotriazol system chemical compound is favorably used as the copper inactivation agent as the copper inactivation agent, and for example, 5-methyl-1H-15benzotriazole, 1-di-octylaminomethyl-benzotriazol, etc. can be used.

The phosphoric acid triester system chemical compound is favorably used as the extreme pressure additive, and for example, the triphenyl-phosphagen, tri-tertiarybutylphenylphosphate can be used in addition to the tricresylphosphate of said compound.

The hydrofluorocarbon, for example, R134a is sealed into the refrigeration cycle A.

The R134a is to be adjusted to a purity of 99.97 wt % to the mixture of chlorine system refrigerant at 56 ppm. In addition, the equilibrium water content (shown in the below equation (I)) inside the refrigeration cycle A is to be adjusted to be 150 ppm under the initial operation state.

$$\frac{\text{Residual water content volume during the refrigeration cycle}}{\text{Filled oil volume + Filled refrigerant volume}} \times 10^6 \text{ (ppm)} \quad (I)$$

The dryer F used in the refrigeration cycle A has a moisture absorbent with a bore diameter of 3 Å. In addition, the residual air volume inside the refrigeration cycle A has been adjusted to 0.005 wt % of the cycle internal volume.

The residual oxygen volume inside the refrigeration cycle A has been adjusted to less than 0.01 vol % of refrigeration cycle internal volume.

The alkylbenzene hard oil (hereinafter to be called HAB) or the ester system oil is used for the machining and assembling of component parts of compressor B and condenser C making up the refrigerating unit, and the used volume of HAB used has been controlled to less than 10% the sealed volume of oil in the refrigeration cycle A.

In addition, the chlorine volume remaining on the component parts of refrigerating unit is controlled to be lower than 20 ppm against the total volume of oils 18 and R134a sealed in the refrigeration cycle A.

That is to say, the total volume between the mixed volume of the chlorine system refrigerant (CFC, HCFC, etc.) within the 134a refrigerant sealed into the refrigeration cycle A and the chlorine volume remaining on the component parts of the refrigerating unit is controlled to be lower than 100 ppm against the total volume of oil 18 and refrigerant sealed into the refrigeration cycle A.

In addition, the winding wire 4 out of the motor element 2 of compressor B is covered with an insulation material of two-layer structure where the layer made of heat resistant ester (THEIC) or ester imide is provided on the inside and moreover the layer made of amid imide is provided on the outside, and the PET film of low oligomer specification (lower than 0.6 wt % as a trimer) is used as the insulation film H for insulating the winding wires 4 together.

And the oil 18 lubricates the sliding face between the roller 10 and the vane 12 which are sliding members of rotary compressor element 3.

The refrigerant flowing into the cylinder 7 of rotary compressor element 3 and being compressed by the cooperative work between the roller 10 and the vane 12 is formed by the R134a having its compatibility with the oil 18 of polyol ester system oil.

Numeral 19 is a suction pipe fitted to the closed vessel 1 for guiding the refrigerant to the suction side of cylinder 7, while Numeral 20 is a discharge pipe fitted to the upper wall of closed vessel 1 with the refrigerant being compressed by the rotary compressor element 3 and discharged out of the closed vessel 1 via the motor element 2 and pipe 20.

In the refrigerating machine oil compound being used in the rotary type compressor which has been structured in this way, the refrigerant R134a flows into the suction side of cylinder 7 from the suction pipe 19, is compressed by the cooperative work between the roller 10 and the vane 12, passes through the discharge hole 15, opens the discharge valve 16 and is discharged into a discharge muffler 17. The refrigerant inside this muffler is discharged to the outside of closed vessel 1 from the discharge pipe 20 via the motor element 2. And the oil 18 is supplied to the sliding faces of sliding members of roller 10 and vane 12 of rotary compressor element 3 for their lubrication. In addition, the refrigerant compressed inside the cylinder is prevented from leaking to the low pressure side.

The oil is generally discharged to the side of condenser C from the inside of this closed vessel 1 together with the refrigerant being discharged out of the discharge pipe 20 of rotary compressor B, but the refrigerating machine oil flows through the refrigeration cycle A with the refrigerant in the high temperature region where there is high refrigerant pressure, but the oil viscosity becomes high and its fluidity is lost in the low temperature region where there is low refrigerant pressure and tends to stay stagnant inside the refrigeration cycle A. Namely, the refrigerating machine oil tends to remain inside the evaporator E. Especially, in case of the conventional paraffin system and naphthane system mineral oil having a worse compatibility with the refrigerant or the refrigerating machine oil of alkylbenzene oil and the like, the freezing point temperature of this refrigerating machine oil doesn't become lower because of the refrigerant, and the oil viscosity becomes additionally higher inside the evaporator E and its fluidity is conspicuously lost. To solve this problem, the present invention uses as a base oil the polyol ester oil having a compatibility with such a refrigerant, such as a special R134a, further mixes the base oil of mineral oil or alkylbenzene oil and moreover can compensate for the defect of hydrolysis and the like of polyol ester oil. Further by mixing it, the refrigerant R134a and so forth dissolves into the mixed oil, the freezing point temperature falls, down thereby, and the suppression of viscosity rise can be achieved so that its fluidity inside the evaporator E may not be lost.

Figure 3:
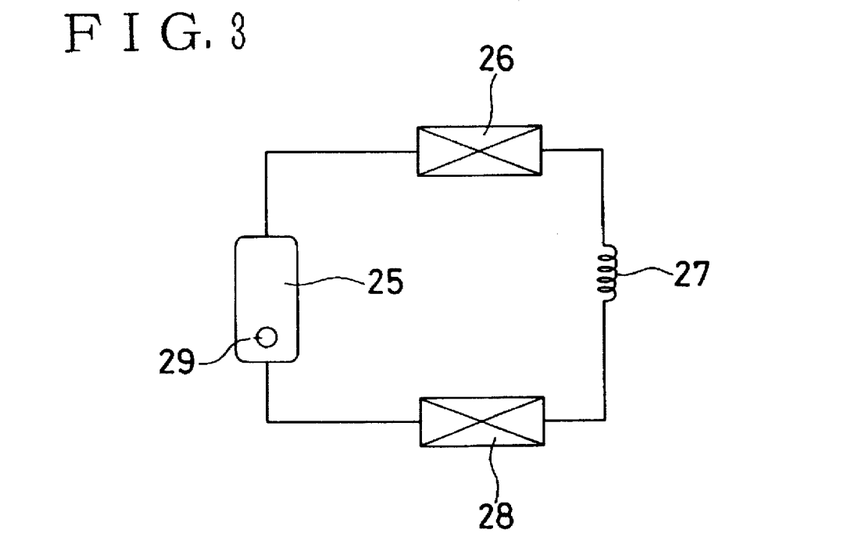
FIG. 3 is a circuit diagram of a refrigeration cycle testing machine used in this invention.

It is possible to prevent the chemical stability of the mixed oil from being damaged by suppressing the polyol ester system oil contained in the mineral oil or the alkylbenzene oil down to 50 weight % from 10 weight. This fact could be confirmed from the following experiments: Namely, not simply the return state of mixed oil 18 was confirmed using the refrigeration cycle, testing machine as shown in FIG. 3, but the total acid value of the refrigerating machine oil was evaluated using the iron and the copper as catalysts under the air atmosphere.

Numeral 25 denotes a rotary compressor corresponding to the rotary compressor B, Numeral 26 is a heat exchanger corresponding to a condenser C, Numeral 27 is a pressure reducing unit corresponding to the pressure reducing unit (capillary tube) D, and Numeral 28 is a heat exchanger corresponding to the evaporator E, and they are connected with pipes. A sight glass 29 for confirming the volume of refrigerating machine oil is mounted to the rotary compressor 25. The test conditions were set as follows to confirm the oil return property of mixed oil 18 when the mixed ratio between the alkylbenzene oil and the polyol estersystem oil was changed: The capacity of rotary compressor 25 at 175 W, the condensing temperature of heat exchanger 26 at 40° C., the evaporation temperature of heat exchanger 28 at 25°–25° C. and the R134a as the used refrigerant. In addition, the catalysts of iron and copper were entered into the mixed oil 18 in the air atmosphere, which was heated up to 90° C. to measure the total acid value after the lapse of 30 days. Table 1 shows its results.

decreased, the compatibility between the polyol ester oil 18 and the R134a refrigerant can be secured, thus a stable performance can be obtained.

Further, the polyol ester oil of this invention provide a better compatibility with the hydrofluorocarbon system refrigerant such as the R134a and the like, over the entire temperature zone being used in the refrigerating unit, and can eliminate the two-layer separation between the refrigerant and the oil. Consequently, because the polyol ester oil 18 exists in the state dissolved into the R134a at all times in the low temperature region lower than −30° C. in the refrigeration cycle A and has a low viscosity as a whole, the oil return to the compressor becomes favorable. Therefore, the fall of the oil level of compressor B can be eliminated and the oil supply to the bearing sliding portions 8, 13 and 14 can be secured for the prevention of their gnawing and the burning. Still more, by the action that the ester coupling of the oil itself, mainly the molecule-oriented coupling, there is an enhanced lubricating property on the surfaces of the iron system sliding portions of shaft 8 and bearings 13 and 14 of compressor B and by the action for said ester oil being dissolved into the R134a, the actual viscosity of the polyol ester oil 18 according to this invention can be lowered to reduce the machine loss and enhance the actual record (operating) coefficient of compressor B.

In addition, because a sludge catcher G (formed by bonding the active alumina particles with a binder) for catching the sludge in the cycle has been installed at the high pressure side of refrigeration cycle A, the sludge generated

TABLE 1

| Mixing Ratio | Alkylbenzene oil (wt %) | 100 | 95 | 90 | 80 | 50 | 20 | 0 |
|---|---|---|---|---|---|---|---|---|
| | Polyol ester oil (wt %) | 0 | 5 | 10 | 20 | 50 | 80 | 100 |
| Heat stability | | <0.01 | <0.01 | 0.01 | 0.01 | 0.02 | 0.06 | 0.06 |
| Total acid value (mgKOH/g) | | | | | | | | |
| Oil return property | | Not good | Not good | Slightly good | Good | Good | Good | Good |

Criteria:
Not good: the oil level inside the compressor fell down.
Good: The oil level inside the compressor hardly changed.

A slight corrosion appears to the sliding areas if the total acid value should exceed the level of 0.02 mgKOH/g.

As a result, it can be known from Table 1 that the oil return property and heat stability of mixed oil 18 is favorable when the polyol ester system oil was contained at 10 to 50 weight -t -in place of the alkylbenzene oil. This is believed to be attributable to the fact that the hydrolysis of polyol ester system oil by the frictional heat at the sliding- 2.4 - areas of rotary compressor 25 can be suppressed by making the volume of polyol ester system oil less than the volume of alkylbenzene oil. And the reason why the oil return property becomes better when its mixing percentage becomes higher is believed to be attributable to the fact that the refrigerant of R134a gets dissolved into the polyol ester system oil, the freezing point temperature of mixed oil 18 falls down and therefore the fall of viscosity of this mixed oil 18 inside the evaporator 28 is suppressed.

According to the present embodiment, the following actions can be provided by the above mentioned structure: Because the purity of R134a refrigerant has been made extremely high, the foreign materials and CFC hardly enter into the refrigeration cycle A, the chlorine cannot decompose the polyol ester oil 18 into the formation of fatty acid, the formation of metallic soap after its reaction with the metals can be prevented, the deposition of sludge can be in the refrigeration cycle A and the fatty acid generated by the hydrolysis of ester oil can be adsorbed by this sludge catcher to previously prevent the formation of metallic soap.

Further, because the alkylbenzene oil or the mineral oil are used as its base oil in addition to the polyol ester oil as the base oil of the refrigerating machine oil 18, the trouble of polyol ester oil, namely, the hydrolysis by the frictional heat of sliding portions 8, 13 and 14 of compressor can be decreased to a minimum level, the formation of metallic soap can be suppressed and the sludge can be almost prevented. Therefore, the fall of oil level of compressor B can be eliminated, the oil supply to the bearing sliding portions 8, 13 and 14 can be secured and their gnawing and burning can be prevented.

Moreover, the invention can prevent the oil 18 from causing the hydrolysis in the initial operation period of the refrigerating unit, decrease the total acid value, suppress the generation of sludge due to the formation of metallic soap and can secure the lubrication characteristics at the sliding portions 8, 13 and 14.

This matter was also confirmed from the experimental results of the sealed tube test, which sealed the polyol ester system oil 18 of this invention to which the DBPC was added.

Namely, according to the polyol ester system oil 18 of this invention to which the DBPC was added under the condition where the water content was adjusted to 200 ppm in the aging of 90° C.×29 days, the total acid value became lower than 0.01 mgKOH/g in the initial stage, and a favorable result could be obtained.

In addition, the oxidation/deterioration of polyol ester oil is prevented and the sludge due to the polymerization can result in a refrigerating unit excellent in its reliability.

This matter was also confirmed from the experimental results by the sealed tube test on the sealed polyol ester system oil of this invention to which the DBPC was added.

Namely, according to the polyol ester system oil 18 of this invention to which the DBPC was added under the condition where the residual oxygen volume inside the refrigeration cycle A was adjusted to less than 0.01 vol % in the aging of 90° C.×29 days, the total acid value becomes lower than 0.01 mgKOH/g in the initial stage, and a favorable result could be obtained.

Further, because the alkylbenzene hard oil (HAB) and the ester oil which are easier to dissolve into the R134a were used in the machining and assembling of component parts, and the volume of used HAB was limited, the residual chlorine volume of process submaterials could be vastly decreased to prevent it from caking to the evaporator E and the like in the refrigeration cycle A and to prevent the fall of refrigeration capability and damage of equipment B, C, D, E and F.

Because the chlorine volume remaining on the component parts of compressor B, condenser C and a variety of pipes making up the refrigerating unit was regulated by the structure of claim 9, it becomes possible to prevent the formation of metallic soap by the decomposition, oxidation, deterioration and polymerization reaction of polyol ester oil 18 and the formation of high molecule sludge and to prevent the sludge from staying stagnant on the evaporator E and the like of refrigeration cycle A.

Moreover, because the total volume of the mixed volume of the chlorine system refrigerant in the R134a refrigerant sealed into the refrigeration cycle A and the chlorine volume remaining on the component parts of refrigerating unit has been regulated to less than 100 ppm against the total volume of oil 18 and refrigerant sealed into the refrigeration cycle by the structure of claim 10, the mixing of chlorine in the refrigeration cycle A can be regulated for the entire unit, preventing the formation of metallic soap by the decomposition, oxidation/deterioration and polymerization/reaction of polyol ester oil 18 and the formation of high molecule sludge, and thus resulting in a refrigerating unit capable of exhibiting stable performance.

Further, the polyol ester oil 18 of this invention can enhance the oxidation deterioration stability as compared with the glycol oil and the like and can enhance the performance and reliability of compressor B.

This matter could be confirmed also from the experimental results of the sealed tube test using the polyol ester system oil 18 of this invention to which the DBPC was added.

That is to say, according to the polyol estersystem oil 18 of this invention to which the DBPC was added under the condition where the water content was adjusted to 200 ppm through the aging of 90° C.×29 days, the total acid value became lower than 0.01 mgKOH/g at the initial stage and a favorable result could be obtained.

Moreover, the polyol ester oil can be adsorbed on to the copper surfaces which become the bearing sliding faces 8, 10, 13 and 14, suppress its catalytic action and also suppress the hydrolysis of the refrigerating machine oil.

In addition, a strong chemical adsorption film can be formed on the bearing sliding faces 8, 10, 13 and 14, making the lubrication property of sliding areas 8, 10, 13 and 14, thus preventing their gnawing and burning.

The hydrolysis can be suppressed, which can decrease the total acid value to suppress the formation of metallic soap and enhance the reliability of unit.

Figure 4:
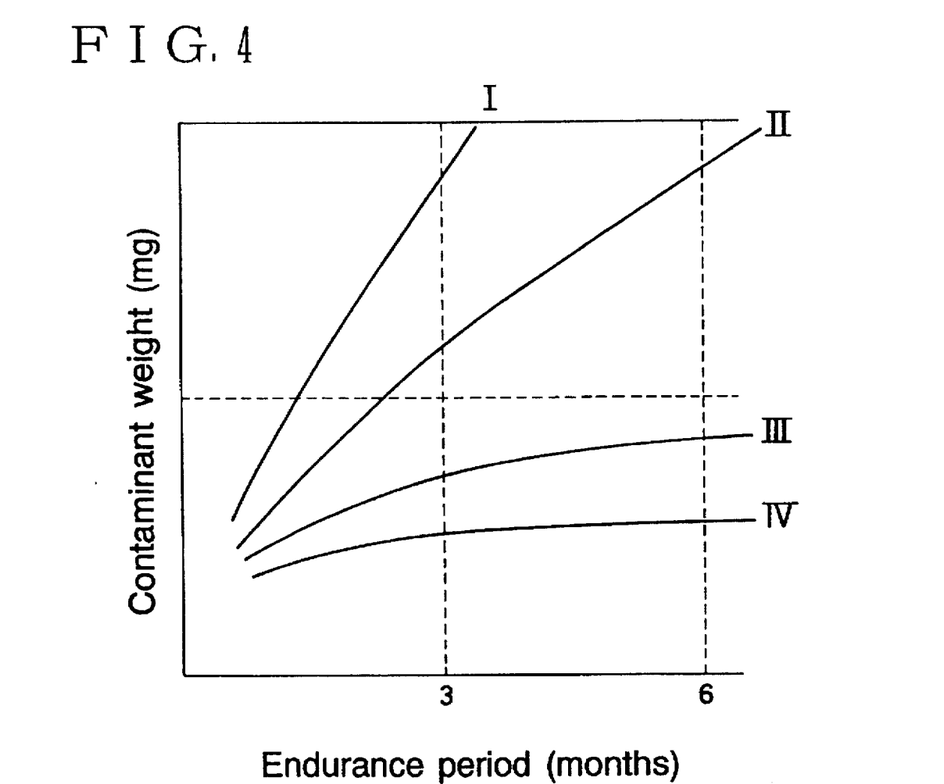
FIG. 4 is a graph showing the endurance test result by an actual refrigerating unit.

The said operation results could be confirmed also from the endurance test results shown in FIG. 4 by use of the actual machine. In FIG. 4, the endurance test time was taken on the abscissa axis and the contamination level (sludge volume) was taken on the ordinate axis. The studied specimens and conditions are as shown in the below Table 2:

TABLE 2

|  | Additive | Manufacturing standard |
|---|---|---|
| I | No additive | A |
| II | X | A |
| III | Y | A |
| IV | Z | B |

Additive:
Additive X: DBPC + BTA
Additive Y: DBPC + BTA + TCP
Addtiive Z: DBPC + BTA + TCP + Epoxy
Manufacturing Standard A: (Conventional Standard)
Purity of refrigerant: 99.90 wt %
Equilibrium water content in refrigeration cycle A: 600 ppm
Residual oxygen volume in refrigeration cycle A: 0.03 vol %
Chlorine residue in refrigeration cycle A: 400 ppm
Manufacturing Standard B: (Standard of Present Invention)
Purity of refrigerant: 99.95 wt %
Equilibrium water content in refrigeration cycle A: 200 ppm
Residual oxygen volume in refrigeration cycle A: 0.01 Vol %
Chlorine residue in refrigeration cycle A: 100 ppm The best result was shown by the specimen IV by the Standard B (where the purity of refrigerant and the water content, chlorine and oxygen volumes in refrigeration cycle A were limited as listed above) whose unit manufacturing standard was limited as shown in the present invention and was formed using the specimen Z of polyol ester system oil 18 of this invention with the additive (DBPC, Epoxy, etc.) added.

Figure 5:
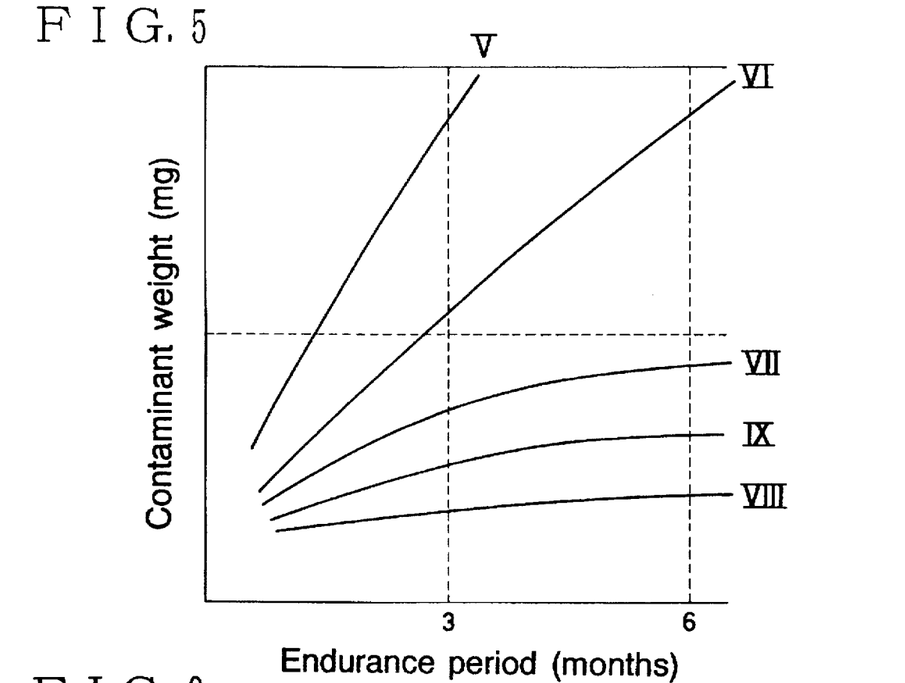
FIG. 5 is a graph showing another endurance test result by the actual refrigerating unit.

Additionally, the operational results in the case in which the sludge catcher of this invention has been added were confirmed also from the endurance test result shown in FIG. 5 by use of the actual machine. In FIG. 5, the endurance test time was taken on the abscissa axis and the contamination level (sludge volume) was taken on the ordinate axis similarly to those of FIG. 4. The studied specimens and conditions are as listed in the following Table 3:

TABLE 3

|  | Additive | Manufacturing standard | Sludge catcher |
|---|---|---|---|
| V | No additive | A | Absence |
| VI | X | A | Absence |
| VII | Y | A | Absence |
| VIII | Y | A | Presence |
| IX | Z | B | Absence |

For information, codes of conditions in Table 3 denote the foregoing conditions.

Because the specimen VIII, where the sludge catcher G was installed, indicated the best result, it can be known that the better contaminant weight reduction can be attempted with the said specimen.

Figure 6:
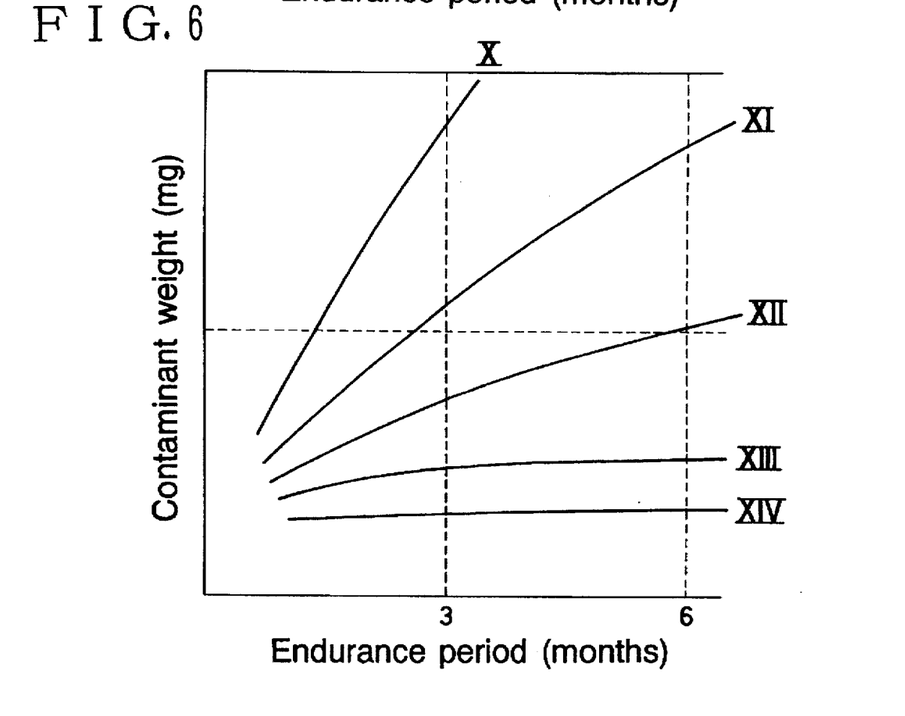
FIG. 6 is a graph showing a still further endurance test result by the actual refrigerating unit.

In addition, the operational result in case of mixing the polyol ester system oil by this invention with the mineral oil or the alkylbenzene oil could be confirmed also from the endurance test result shown in FIG. 6 by use of the actual machine. In FIG. 6, the endurance test time was taken on the abscissa axis and the contamination level (sludge volume) was taken on the ordinate axis similarly to FIG. 4. The studied specimens and conditions are as shown in the following Table 4:

TABLE 4

|  | Refrigerating machine oil | Additive | Manufacturing standard |
|---|---|---|---|
| X | Polyol ester oil alone | No additive | A |
| XI | Mixed oil | No additive | A |
| XII | Mixed oil | X | A |
| XIII | Mixed oil | Y | A |
| XIV | Mixed oil | Z | B |

The codes in the conditions of Table 3 denote the foregoing conditions.

Therefore, it was confirmed that the mixed oil can decrease the contamination level more effectively than the polyol ester system oil alone.

For information, the present embodiment has been explained using the example of R134a as the hydrofluorocarbon system refrigerant, but should not be limited to this refrigerant alone but the polyol ester system oil of this invention can exhibit an excellent compatibility even against the other refrigerants of HFC, and can be applied to these refrigerants.

According to the present invention as described above, the hydrolysis by the influence of water content on the polyol ester system oil can be suppressed to decrease the total acid value, suppress the formation of metallic soap for giving an adverse influence on the refrigeration cycle and also suppress the decomposition, oxidation deterioration and polymerization reaction by the influences of oxygen and chlorine to prevent the formation of metallic soap and high molecule sludge, and thus being able to obtain a favorable refrigerating unit by maintaining the purity of hydrofluorocarbon system refrigerant to a high value, using the particular raw material of the used polyol ester system oil, using the raw material of the particular physical property range, adding a special additive, suppressing the equilibrium water content of the refrigeration cycle, limiting the residual oxygen volume in the refrigeration cycle, using the alkylbenzene hard oil (hereinafter to be called HAB) or the ester system oil to the oil used during the machining and assembling processes of component parts, and limiting the mixed volume of chlorine system refrigerant and the chlorine volume remaining on the component parts.

What is claimed is:

1. A refrigerating unit using a hydrofluorocarbon system refrigerant in a refrigeration cycle and having at least one refrigerating machine oil with a polyol ester oil as its base oil, wherein said polyol ester oil is a chemical compound prepared by polymerizing without a catalyst at least one polyol having at least two functional groups with at least one alkyl fatty acid having a straight chain or a branched chain, the poly ester oil having a fluidity point lower than −40° C., a two-liquid separation temperature lower than −20° C., a total acid value lower than 0.02 mgKOH/g, a viscosity of 8 to 100 cst at 40° C. and a viscosity index of at least 80, the hydrofluorocarbon system refrigerant having its purity higher than 99.95 wt % and the amount of chlorine impurity in the system refrigerant being lower than 80 ppm.

2. A refrigerating unit as in claim 1, wherein the unit comprises a compressor, a condenser, a pressure reducing unit and an evaporator connected to perform the refrigerating cycle, and further including at least one sludge catcher for capturing sludge during the refrigeration cycle at the high pressure side of the refrigeration cycle performed by the unit.

3. A refrigerating unit as in claim 1, wherein said refrigerating machine oil contains at least one base oil selected from the group consisting of alkylbenzene system oil and mineral system oil.

4. A refrigerating unit as in claim 1, wherein the polyol having at least two functional groups is selected from the group consisting of neopentylglycol, trimethylolpropane and pentaerythritol.

5. A refrigeration unit as in claim 1 wherein the equilibrium water content as defined by:

$$\frac{\text{residual water content volume during the refrigeration cycle}}{\text{filled oil volume + filled refrigerant volume}} \times 10^6 \text{ (ppm)} \quad (I)$$

in the refrigeration cycle is lower than 200 ppm in its initial operation state.

6. A refrigerating unit as in claim 1, wherein the residual oxygen volume in the refrigeration cycle is less than 0.01 vol % of the volume of the refrigeration cycle.

7. A refrigerating unit as in claim 1, whose component parts comprise a compressor, a condenser, a pressure reducing unit and an evaporator connected to produce the refrigeration cycle, the volume of the chlorine remaining on the component parts being less than 20 ppm of the total volume of lubricant and system refrigerant used for the refrigeration cycle.

8. A refrigerating unit as in claim 1, whose component parts comprise a compressor, a condenser, a pressure reducing unit and an evaporator connected to produce the refrigeration cycle, the total volume of the chlorine impurity in the hydrofluorocarbon system refrigerant in the refrigeration cycle remaining on the component parts being less than 100 ppm of the total volume of oil and system refrigerant of the refrigeration cycle.

9. A refrigerating unit as in claim 4, further comprising 0.1 to 0.5 wt % of phenol system oxidation preventive agent as an additive in the polyol ester oil; wherein the phenol system oxidation preventive agent is selected from the group consisting of 2,6-di-tertiarybutyl-paracresol (DBPC), 2,6-di-tertiarybutyl-phenol and 2,4,6-tritartiarybutyl-phenol.

10. A refrigerating unit as in claim 4, further comprising at least one copper inactivation agent selected from the benzotriazole system chemical compounds of less than 20 ppm as an additive to the polyol ester oil.

11. A refrigerating unit as in claim 4, wherein at least one high pressure additive of a phosporic acid triester system chemical compound of less than 2 wt % is added to the polyol ester oil.

12. A refrigerating unit as in claim 4, further comprising at least one epoxy system additive of 0.1 to 0.5 wt % added to the polyol ester oil.

13. A refrigerating unit as in claim 3 wherein the polyol having at least two functional groups is selected from the group consisting of neopentylglycol, trimethylolpropane and pentaerythritol.

* * * * *